US012780091B2

(12) United States Patent
Elfrink

(10) Patent No.: US 12,780,091 B2
(45) Date of Patent: Nov. 3, 2026

(54) INTERIOR LIGHTING SYSTEM FOR VEHICLE

(71) Applicant: Lightyear Layer IPCo B.V., Helmond (NL)

(72) Inventor: Jasper Elfrink, Vierlingsbeek (NL)

(73) Assignee: Lightyear Layer IPCo B.V., Helmond (NL)

( * ) Notice: Subject to any disclaimer, the term of this patent is extended or adjusted under 35 U.S.C. 154(b) by 86 days.

(21) Appl. No.: 18/711,453

(22) PCT Filed: Nov. 23, 2022

(86) PCT No.: PCT/EP2022/083038

§ 371 (c)(1),
(2) Date: May 17, 2024

(87) PCT Pub. No.: WO2023/094482

PCT Pub. Date: Jun. 1, 2023

(65) Prior Publication Data

US 2026/0167104 A1 Jun. 18, 2026

(30) Foreign Application Priority Data

Nov. 23, 2021 (NL) ...................................... 2029862

(51) Int. Cl.
*B60Q 3/54* (2017.01)
*B60Q 3/51* (2017.01)
(Continued)

(52) U.S. Cl.
CPC ............... *B60Q 3/54* (2017.02); *B60Q 3/745* (2017.02); *B60Q 3/80* (2017.02); *B60Q 3/51* (2017.02)

(58) Field of Classification Search
CPC ............. B60Q 3/54; B60Q 3/745; B60Q 3/80
See application file for complete search history.

(56) References Cited

U.S. PATENT DOCUMENTS 5,143,437 A 9/1992 Matsuno et al.
2009/0251917 A1 10/2009 Wollner et al.
(Continued)

FOREIGN PATENT DOCUMENTS

CN 105329076 B * 2/2018
CN 117097234 A * 11/2023 ............. F24S 25/60
(Continued)

OTHER PUBLICATIONS

Netherlands Search Report and Written Opinion dated Jan. 22, 2022, for Netherlands Patent Application No. 2029862.
(Continued)

*Primary Examiner* — Keith G. Delahoussaye
(74) *Attorney, Agent, or Firm* — Patterson + Sheridan, LLP

(57) ABSTRACT

An interior lighting system for a vehicle. The vehicle comprising a non-transparent roof comprising an outside surface exposed to environment and an inside surface exposed to an internal volume of the vehicle. A sensor device is configured to infer a characteristic of light impinging on a section of the outside surface. An illumination device is configured to emit light from a section of the inside surface. A control device controls the illumination device such that at least one characteristic of light emitted from the section of the inside surface mimics the at least one characteristic of light impinging on the section of the outside surface inferred by the sensor device. A computer-implemented method and a related computer control program (with instructions), when implemented and/or executed, control an interior lighting system of a vehicle.

16 Claims, 7 Drawing Sheets

(51) Int. Cl.
*B60Q 3/74* (2017.01)
*B60Q 3/80* (2017.01)

(56) References Cited

U.S. PATENT DOCUMENTS

| | | | | |
|---|---|---|---|---|
| 2011/0084852 | A1 | 4/2011 | Szczerba | |
| 2017/0349094 | A1* | 12/2017 | Salter | B60Q 1/00 |
| 2018/0050636 | A1* | 2/2018 | Espig | B60R 1/23 |
| 2018/0297515 | A1* | 10/2018 | Laluet | B60J 1/001 |

FOREIGN PATENT DOCUMENTS

| | | | |
|---|---|---|---|
| EP | 2933699 | A1 | 10/2015 |
| FR | 2934205 | A1 | 1/2010 |
| WO | 2015026296 | A1 | 2/2015 |
| WO | 2020229475 | A1 | 11/2020 |

OTHER PUBLICATIONS

PCT International Search Report and Written Opinion dated Mar. 16, 2023, for International Patent Application No. PCT/EP2022/083038.

* cited by examiner

INTERIOR LIGHTING SYSTEM FOR VEHICLE

BACKGROUND

The invention relates to a vehicle with a non-transparent roof and an internal volume for containing passengers, and a lighting system for lighting at least part of the internal volume.

The majority of vehicles have a roof, either transparent or non-transparent.

Transparent roofs typically comprise a glass or otherwise transparent part through which external light can enter the interior of the car. This is appreciated by many passengers as it gives a better connection with the environment.

This invention relates to a vehicle with a non-transparent roof and aims to give passengers a similar connection with the environment as a transparent roof. This is especially appreciated for vehicles where a transparent roof cannot be used, for example because the roof is part of a photovoltaic system (a PV system), such as for example used in the Lightyear One, commercially available from Atlas Technologies B.V., Helmond, the Netherlands.

It is noted that most vehicles, either with a transparent or a non-transparent roof, have internal lighting, to be used, for example, when parked at night to read maps, etc. Preferably these are dimmed when driving to improve the night vision of the driver.

Document WO2015/026296 describes an apparatus for providing illumination to an interior of a vehicle. The apparatus comprises input means configured to provide input data varying according to an environment surrounding the vehicle. The input data is processed to determine characteristics of the illumination to be provided. The apparatus comprises output means configured to provide the illumination with the determined characteristics to the interior of the vehicle. The characteristics of the output means match the characteristics of the environment surrounding the vehicle when the illumination is provided. In a particular embodiment, the output means comprise a LED-strip aligned along the roof liner. An image is repeatedly acquired by a camera through each window of the vehicle and is associated with a group of LEDs along the portion of the LED strip over the window. First, an area of interest is selected from the image. Then, the area of interest is divided into multiple segments. The number of segments is equal to the number of LEDs corresponding to the image, so the illumination characteristics determined for each segment is projected by an associated LED along the LED-strip. In other words, the characteristics of the light in the image is used to determine characteristics of the illumination to be provided. The image is captured by a camera through each window. Thus, the illumination of the LEDs along the LED-strips is determined based on the light as seen through each window. The LED-strips around the window then emit light with the determined characteristics, essentially "extending" the light that is seen through the window in an area around the window.

The disadvantage the system described in WO2015/026296 is that it is not usable for determining and projecting illumination characteristics for a non-transparent surface, such as for example a non-transparent roof of a vehicle. The system of WO2015/026296 merely provides a system wherein characteristics of the light entering the vehicle through a window is used to determine characteristics of the light emitted by light sources within the vehicle. Thus, light that is already visible inside of the vehicle is "projected" to other parts of the inside of the vehicle, essentially "extending" such light to parts of the vehicle where it before could not reach.

SUMMARY

The invention intends to overcome one or more of the disadvantages of conventional interior lighting systems, or at least to provide an alternative for conventional interior lighting systems. The invention intends to combine the advantages of a transparent roof with the benefits of a non-transparent roof.

In a first aspect of the invention, the invention relates to an interior lighting system for a vehicle, the vehicle comprising a non-transparent roof, the non-transparent roof comprising an outside surface which is exposed to an environment surrounding the vehicle and an inside surface which is exposed to an internal volume of the vehicle, the interior lighting system comprising:

- a sensor device configured to infer at least one characteristic of light impinging on a section of the outside surface of the non-transparent roof of the vehicle;
- an illumination device configured to emit light from a section of the inside surface of the non-transparent roof of the vehicle into the internal volume of the vehicle;
- a control device connected to the sensor device and the illumination device, the control device being configured to control the illumination device such that at least one characteristic of light emitted from the section of the inside surface of the non-transparent roof mimics the at least one characteristic of light impinging on the section of the outside surface of the non-transparent roof inferred by the sensor device;
- wherein the section of the outside surface of the non-transparent roof of the vehicle is associated with the section of the inside surface of the non-transparent roof of the vehicle.

The interior lighting system can be arranged to illuminate the interior of the vehicle. The vehicle comprises an interior volume, for example a cabin wherein people can be seated. For example, the people seated in the cabin are the driver and/or the passengers of the vehicle. The vehicle comprises a non-transparent roof, i.e., little to no outside light can penetrate the non-transparent roof. A non-transparent roof may comprise a relatively small transparent part, for example a conventional sunroof. This is in contrast to a transparent roof, where at least part of the outside light can penetrate the non-transparent roof to illuminate the inside volume of the vehicle. For example, the non-transparent roof fully covers the interior volume. For another example, the non-transparent roof borders a front windshield and/or a rear windshield and/or side windows. In many examples, the vehicle at least has a front windshield for the driver to look out of. In some examples, the vehicle has no rear windshield and thus the non-transparent roof extends fully towards the rear end of the vehicle. In such examples, the non-transparent roof may be provided with a hinge such that the non-transparent roof comprises a portion that functions as a panel of the trunk of the vehicle. Due to the non-transparency of the roof, outside light may illuminate the interior volume exclusively through windows and windshields of the vehicle, or in some cases through a relatively small transparent part of the roof, for example a conventional sunroof.

The non-transparent roof comprises an outside surface and an inside surface. The outside surface of the non-transparent roof is exposed to an environment surrounding the vehicle. When the vehicle is driving outdoors, the environment comprises natural elements such as trees, animals including birds, clouds, the sun, . . . and comprises human-made elements such as street lamps, buildings, bridges, . . . . The light impinging on the vehicle is either direct or indirect sunlight, or light emitted by a human-made element such as a street lamp. The outdoor light (coming from the sun during the day, for example, or coming from a street lamp during the night, for example) may be at least partially blocked by natural elements such as trees, or human-made elements such as bridges or buildings. When the vehicle is driving indoors, the environment comprises comparable natural and human-made elements. However, the light impinging on the vehicle when driving indoors is either indirect light (which penetrates a surface such as a window of a building) or artificial (coming from light sources such as indoor lighting). The outside surface of the non-transparent roof, being exposed to the environment surrounding the vehicle, is exposed to the outside lighting coming from natural elements and man-made elements.

The inside surface of the non-transparent roof is at least partially exposed to the internal volume of the vehicle. For example, the inside surface of the non-transparent roof is fully exposed to the internal volume of the vehicle. In other words, the inside surface of the non-transparent roof is visible to any people that are within the interior volume of the vehicle.

The interior lighting system comprises a sensor device. The sensor device is configured to infer at least one characteristic of light impinging on a section of the outside surface of the non-transparent roof of the vehicle. In some examples, the sensor device is configured to infer a plurality of characteristics of light impinging on a section of the outside surface of the non-transparent roof of the vehicle. For example, the section of the outside surface of the non-transparent roof is a rectangular area of the outside surface of the non-transparent roof. For example, the outside surface of the non-transparent roof comprises a plurality of equally-sized rectangular sections. For another example, the outside surface of the non-transparent roof comprises a single section, i.e., the section of the outside surface of the non-transparent roof encompasses the outside surface of the non-transparent roof. The at least one characteristic of the light comprises for example the intensity of the light, which may be the luminance of a light source and/or the illuminance of the light impinging on the section of the outside surface of the non-transparent roof. For example, the illuminance is expressed in lux, i.e., lumens per square meter. The at least one characteristic of the light for example comprises a colour of the light. For example, the colour of the light is expressed as a Red/Green/Blue (RGB) value. The sensor device in some examples is directly equipped to measure the characteristics of the light impinging on the section of the outside surface of the non-transparent roof. For example, the sensor device is a light meter arranged on or near the section of the outside surface of the non-transparent roof, the light meter being adapted to measure illuminance. For another example, the sensor is a spectrometer which is adapted to measure several characteristics of the light impinging on the section of the outside surface of the non-transparent roof, such as Irradiance (W/cm2), Illuminance (lux or fc), Radiance (W/sr), Luminance (cd), Flux (Lumens or Watts), Chromaticity, and Color Temperature. To infer the at least one characteristic of the light impinging on the section of the outside surface, the sensor device for example directly measures the at least one characteristic of the light impinging on the section of the outside surface, i.e., a directly measured characteristic is used as the inferred characteristic. In another example, the sensor device infers the light impinging on the section of the outside surface by indirect measurement. For example, the sensor device is located outside of the section of the outside surface. In such a case, the sensor device measures the at least one characteristic of the light impinging on the sensor device. Then, the sensor device infers the at least one characteristic of the light impinging on the section of the outside surface by transforming the at least one characteristic of the light impinging on the sensor device. For example, the sensor device buffers a number of direct measurements over time, and, based on the velocity of the vehicle and the distance of the sensor device to the section of the outside surface, infers that the direct measurement of the at least one characteristic of the light impinging on the sensor device as the at least one characteristic of the light impinging on the section of the outside surface at a later point in time.

The interior lighting system comprises an illumination device. The illumination device is configured to emit light from a section of the inside surface of the non-transparent roof of the vehicle into the internal volume of the vehicle. For example, the illumination device is arranged along the inside surface of the non-transparent roof. For example, the illumination device comprises one or more LED-strips that are installed on or embedded within the inside surface of the non-transparent roof. For another example, the illumination device comprises lighting panels, which lighting panels are installed on or embedded within the inside surface of the non-transparent roof. The illumination device in some examples comprises a single light source, which light source is controllable to emit light. In some other examples, the illumination device comprises a plurality of light sources, which light sources are individually addressable and as such are controllable to emit light individually. Therefore, in such examples, the at least one characteristic of light emitted from the section of the inside surface by the illumination device is spatially controllable. In other words, within the illumination device, each light source of the plurality of light sources can emit light with different characteristics. The inside surface of the non-transparent roof of the vehicle is for example divided into equally-sized sections, which sections are for example rectangular, which sections are for example square.

The lighting system comprises a control device connected to the sensor device and the illumination device. The control device is configured to control the illumination device such that at least one characteristic of light emitted from the section of the inside surface mimics the at least one characteristic of light impinging on the section of the outside surface of the non-transparent roof inferred by the sensor device. To mimic the at least one characteristic of light impinging on the section of the outside surface of the non-transparent roof inferred by the sensor device, the control device is for example configured to control the illumination device such that the illumination device emits light having at least one characteristic, optionally all characteristics, in common with the characteristics that were inferred by the sensor device. In another example, to mimic the at least one characteristic of light impinging on the section of the outside surface of the non-transparent roof inferred by the sensor device, the control device is configured to control the illumination device such that the illumination device emits light having at least one characteristic which is a linear transformation of a characteristic that was inferred by the sensor device. In this example, for example the sensor device is configured to infer the colour of the light impinging on the section of the outside surface in the full RGB colour space, while the illumination device emits light wherein the colour of the light is transformed to grayscale.

The section of the outside surface of the non-transparent roof of the vehicle is associated with the section of the inside surface of the non-transparent roof of the vehicle. Thus, the inferred at least one characteristic of the light impinging on the section of the outside surface is used by the controller to control the illumination device. The section of the outside surface and the section of the inside surface may for example be of identical size and have an identical position on the non-transparent roof, thus there being a 1-1 correspondence between the section of the outside surface and the section of the inside surface. In another example, the section of the outside surface encloses the section of the inside surface, i.e., there is a 1-n relationship between sections of the outside surface and sections of the inside surface. In this example, thus, the sections of the inside surface are smaller than the sections of the outside surface. In yet another example, the section of the inside surface encloses the section of the outside surface, i.e., there is a 1-n relationship between sections of the inside surface and sections of the outside surface.

By controlling the illumination device in such a way as to mimic the at least one characteristic of light impinging on the section of the outside surface of the non-transparent roof, an effect that the roof is transparent is generated. For example, persons within the internal volume of the vehicle looking at the inside surface of the non-transparent roof have the impressions that they are looking through the non-transparent roof, since they are observing light being emitted by the illumination device from the section of the inside surface of the non-transparent roof, wherein the light that is emitted has at least one characteristic that mimics the at least one characteristic of light impinging on the section of the outside surface of the non-transparent roof.

In an embodiment according to the first aspect of the invention, the non-transparent roof comprises a plurality of roof sections, the roof sections being arranged in a pattern. Each roof section of the non-transparent roof comprises a corresponding section of the outside surface of the non-transparent roof and a corresponding section of the inside surface of the non-transparent roof.

For example, the outside surface of the non-transparent roof comprises the same pattern of sections as the inside surface of the non-transparent roof. For example, the roof sections are rectangular, meaning that the sections of the inside surface are rectangular and the sections of the outside surface are rectangular. For example, the roof sections are square, meaning that the sections of the inside surface are rectangular and the sections of the outside surface are square.

In some examples, the sections of the outside surface and the sections of the inside surface are of identical size, meaning that the inside surface comprises a same number of sections as a number of sections comprised by the outside surface. In such a configuration, each section of the inside surface is identical in size to a corresponding section of the outside surface at a corresponding position; in other words, the section of the inside surface is located directly beneath a corresponding section of the outside surface. In other examples, each section of the outside surface encompasses multiple corresponding sections of the inside surface. In other words, the sections of the inside surface are smaller than the sections of the outside surface and multiple sections of the inside surface are contained within each section of the outside surface. In other examples, each section of the inside surface encompasses multiple corresponding sections of the outside surface. In other words, the sections of the inside surface are larger than the sections of the outside surface and multiple sections of the outside surface are contained with each section of the inside surface.

The sections of the outside surface define an outside resolution and the sections of the inside surface define an inside resolution. The outside resolution defines the precision with which the light impinging on the non-transparent roof is inferred. The light impinging on each section of the outside surface is inferred by the sensor device. Thus, by increasing the number of sections of the outside surface, the outside resolution is increased, and the precision of inferring light impinging on the non-transparent roof is increased. In other words, by increasing the number of sections of the outside surface, the sensor device infers more values representing the light impinging on the non-transparent roof, i.e., one value per section of the outside surface. Similarly, the inside resolution defines the precision with which the at least one characteristic of the light impinging on the outside surface of the non-transparent roof is mimicked by the control device. By increasing the number of sections of the inside surface, the inside resolution is increased, and the precision of mimicking the at least one characteristic of the light impinging on the outside surface of the non-transparent roof, by emitting light from the inside surface, is increased. In other words, by increasing the number of sections of the inside surface, more values representing the light impinging on the non-transparent roof can be mimicked, i.e., one value per section of the inside surface.

Optionally, in this embodiment, the roof sections are arranged in a grid pattern.

The grid pattern for example defines a rectangle. In other words, the grid pattern defines a rectangular area of the non-transparent roof, which rectangular are comprises the plurality of roof sections.

Optionally, in this embodiment, the interior lighting system comprises a same number of illumination devices as a number of roof sections, each illumination device being configured to emit light from a respective section of the inside surface of the non-transparent roof.

In other words, a separate and distinct illumination device emits light from each section of the inside surface. Thus, the illumination devices correspond to the pattern of roof sections. Since there are a plurality of roof sections, the number of illumination devices is at least two. In some examples, the inside surface is covered by or formed by the illumination devices.

Optionally, in this embodiment, the sensor device is configured to infer at least one characteristic of light impinging on each section of the outside surface of the non-transparent roof. The control device is configured to control each illumination device such that the at least one characteristic of the light emitted by a respective illumination device mimics the at least one characteristic of light impinging on a respective section of the outside surface of the non-transparent roof.

In other words, the at least one characteristic of light impinging on the area of the outside surface defined by the pattern of roof sections is inferred by the sensor device. The inferred at least one characteristic of light impinging on the area of the outside surface is mimicked by emitting light from a corresponding area of the inside surface. The effect of mimicking a transparent roof is enhanced by increasing the outside resolution and/or the inside resolution.

Optionally, in this embodiment, the interior lighting system comprises a same number of sensor devices as the number of roof sections, each sensor device being configured to infer at least one characteristic of light impinging on a respective section of the outside surface of the non-transparent roof.

For example, the sensor devices are arranged in or on the section of the outside surface of each roof section. Thus, there is a 1-1 relationship between sensor devices and roof sections. Such a set-up ensures that computation cost of inferring the at least one characteristic of light impinging on each section of the outside surface of the non-transparent roof is lowered, since the sensor device is placed close to the section of the outside surface. Thereby, the sensor device infers the at least one characteristic of light impinging on a respective section of the outside surface of the non-transparent roof by measuring the at least one characteristic directly.

In an embodiment according to the first aspect of the invention, the sensor device is configured to infer the at least one characteristic of the light impinging on the section of the outside surface of the non-transparent roof of the vehicle with an update frequency that is equal to or more than 25 Hz.

Optionally, in this embodiment, the control device is configured to control the illumination device with an update frequency that is equal to or more than 25 Hz.

Optionally, in this embodiment, the illumination device has an update frequency that is equal to or more than 25 Hz.

With an update frequency that is equal to or more than 25 Hz, real-time detection of sunlight impinging on the section of the outside surface is enabled. Thus, real-time mimicking of the inferred at least one characteristic by the illumination device is enabled.

In an embodiment according to the first aspect of the invention, the sensor device is connected to a photovoltaic system comprising a solar cell, the solar cell being arranged on an upwardly facing outside surface of the vehicle. The sensor device is configured to infer the at least one characteristic of the light impinging on the section of the outside surface of the non-transparent roof based on a determination of a parameter indicative of the photovoltaic system's output.

The upwardly facing outside surface is for example the outside surface of the non-transparent roof. For another example, the upwardly facing outside surface is a hood/bonnet of the vehicle. For another example, the upwardly facing outside surface is a trunk/boot of the vehicle.

The photovoltaic cell, i.e., the solar cell, converts light, such as for example sunlight or artificial light, that impinges on the upwardly facing outside surface into electricity. As light impinges on the solar cell, a voltage and a current is output from the solar cell. As the intensity of the light that impinges on the solar cell increases, the current output of the solar cell increases. The total power P generated by the solar cell can be calculated as the product of the voltage output V and the current output I, i.e., $P=V*I$. For example, the photovoltaic system that comprises the solar cell is used to generate electricity for powering certain systems of the vehicle, for example for charging a battery of the vehicle, for example a high-voltage battery of the vehicle. The photovoltaic system's output is dependent on the output (i.e., voltage and current) of the solar cell comprises by the photovoltaic system. In some examples, the photovoltaic system comprises a plurality of solar cells that are connected in series and/or in parallel. The photovoltaic system's output is thus the combined output of the plurality of solar cells.

The sensor device in this embodiment is connected to the photovoltaic system. For example, the sensor device is directly connected to the solar cell. In the case that the photovoltaic system comprises a plurality of solar cells, the sensor device is for example connected to each solar cell of the plurality of solar cells. In another example, the sensor device is connected to the output of the photovoltaic system.

The sensor device is configured to determine a parameter indicative of the photovoltaic system's output. The sensor device, through its connection to the photovoltaic system, receives information about the photovoltaic system's output. For example, the sensor device receives information about the voltage output and current output of each solar cell of the photovoltaic system. In this example, the determined parameter is the voltage output and/or the current output of each solar cell of the photovoltaic system.

The sensor device is configured to infer the at least one characteristic of the light impinging on the section of the outside surface based on the determination of the parameter indicative of the photovoltaic system's output. There is a relationship, for example a linear relationship, between the photovoltaic system's output and the strength of the light impinging on the photovoltaic cell of the photovoltaic system. For example, the strength of the light impinging on the photovoltaic cell is expressed in lux, i.e., lumens per square meter.

Thus, the photovoltaic system comprising solar cells is reused in this embodiment as part of the sensor device to infer the at least one characteristic of the light impinging on the section of the outside surface of the non-transparent roof. Thereby, the complexity of the sensor device is reduced and the installation of additional hardware is avoided.

Optionally, in this embodiment, the solar cell of the photovoltaic system is arranged within the section of the outside surface of the non-transparent roof. The determination of the parameter indicative of the photovoltaic system's output includes a measurement of an electrical power and/or an electrical current and/or an electrical voltage generated by the solar cell.

Thus, the parameter indicative of the photovoltaic system's output is directly usable to infer the at least one characteristic of the light impinging on the section of the outside surface.

Optionally, in this embodiment, the solar cell of the photovoltaic system is arranged outside of the section of the outside surface of the non-transparent roof. The determination of the parameter indicative of the photovoltaic system's output includes a measurement of an electrical power and/or an electrical current and/or an electrical voltage generated by the solar cell. The sensor device is configured to infer the at least one characteristic of the light impinging on the section of the outside surface of the non-transparent roof additionally based on a distance of the solar cell to the section of the outside surface of the non-transparent roof, and a velocity of the vehicle.

In this case, since the solar cell of the photovoltaic system is not arranged within the section of the outside surface, additional processing is necessary to infer the at least one characteristic of the light impinging on the section of the outside surface. By arranging the solar cells outside of the section on the outside surface, the hardware costs can be decreased, as not all sections of the outside surface require a solar cell to be installed within or on them. Additionally, the processing cost is low in this embodiment, as the position, shape, and size of the sections of the outside surface, as well as the position of the solar cell, are constant and known. Therefore, a distance between the solar cell and each section of the outside surface is also known. In this embodiment, the interior lighting system and/or the vehicle comprises a speed sensor and/or a velocity sensor, which speed sensor and/or velocity sensor is configured to measure the speed and/or velocity at which the vehicle is currently travelling, wherein for example the speed and/or velocity is expressed in m/s. Optionally, the velocity sensor and/or speed sensor is configured to determine whether the vehicle is moving forwards or backwards.

Based on the distance of the solar cell to the section of the outside surface of the non-transparent roof, and the speed and/or velocity of the vehicle, the sensor device is configured to infer the at least one characteristic of the light impinging on the section of the outside surface. For example, the sensor device may calculate that, based on the velocity of the vehicle, a determined parameter indicative of the photovoltaic system's output represents the light impinging on the section of the outside surface at a point in time in the future, for example 0.1 s or 0.5 s or 1 s in the future. Therefore, the sensor device may buffer the photovoltaic system's output over time and use said buffered output to infer the at least one characteristic of the light impinging on the section of the outside surface.

Optionally, in this embodiment, the photovoltaic system comprises a plurality of solar cells forming a string of solar cells. The photovoltaic system further comprises a maximum power point tracker connected to the string of solar cells, wherein the maximum power point tracker is configured to convert power between the photovoltaic system and a load. The determination of the parameter indicative of the photovoltaic system's output includes a measurement of an electrical power and/or an electrical current and/or an electrical voltage generated by the string of solar cells, which measurement is provided by the maximum power point tracker.

Maximum Power Point Tracking (MPPT) is used by the maximum power point tracker to optimize power conversion of the string of solar cells. MPPT samples the output of solar cells and/or the output of the solar cell string to determine an operating point to optimize and/or maximize power output of the solar cell and/or string of solar cells. Therefore, the maximum power point tracker receives as input the voltage output and current output of the solar cell and/or the solar cell string.

Therefore, the inputs of the MPPT are reused by the sensor device to determine the parameter indicative of the photovoltaic system's output, thereby reducing hardware costs.

Optionally, in this embodiment, the non-transparent roof comprises a plurality of roof sections, the roof sections being arranged in a pattern. Each roof section of the non-transparent roof comprises a corresponding section of the outside surface of the non-transparent roof and a corresponding section of the inside surface of the non-transparent roof.

The solar cells are arranged in the same pattern as the roof sections, thus the section of the outside surface of each roof section comprises at least one solar cell and/or at least one string of solar cells. In an alternative or additional example, a plurality of solar cells are arranged in a solar module, i.e., a solar panel, and the solar modules are arranged in the same pattern as the roof sections.

Optionally, in this embodiment, the sensor device is configured to infer at least one characteristic of light impinging on each section of the outside surface of the non-transparent roof. The control device is configured to control each illumination device such that the at least one characteristic of the light emitted by a respective illumination device mimics the at least one characteristic of light impinging on a respective section of the outside surface of the non-transparent roof.

Thus, the sensor device is configured to infer at least one characteristic of light impinging on each section of the outside surface based on a determination of a parameter indicative of the photovoltaic system's output. For example, the sensor device determines for each solar module arranged in the pattern of roof sections a parameter indicative of the solar modules'output, e.g., current output and/or voltage output. Since there is a 1-1 relationship between solar modules and sections of the outside surface, the solar modules directly correspond to sections of the outside surface. Thereby, the processing cost for the sensor device to infer at least one characteristic of light impinging on each section of the outside surface is reduced since these at least one characteristic can be directly inferred from the solar module's output. Hardware costs are also reduced since no additional hardware besides the solar modules has to be installed.

Optionally, in this embodiment, the interior lighting system comprises a same number of sensor devices as the number of roof sections, each sensor device being configured to infer at least one characteristic of light impinging on a respective section of the outside surface of the non-transparent roof.

Thereby, the sensor devices are placed close to their respective section of the outside surface, i.e., close to the solar cell and/or solar module for which the sensor device determines the parameter indicative of the output of the solar cell and/or solar module. Thereby, the complexity of the sensor devices is reduced and the wiring between solar cells and/or solar modules and the sensor device is reduced.

Optionally, in this embodiment, the roof sections are arranged in a grid pattern.

The grid pattern for example defines a rectangle. In other words, the grid pattern defines a rectangular area of the non-transparent roof, which rectangular are comprises the plurality of roof sections.

In an embodiment according to the first aspect of the invention, the illumination device is integrated in a roof lining of the inside surface of the non-transparent roof of the vehicle.

The roof lining of the inside surface of the non-transparent roof for example comprises a fabric, for example polyester or nylon; or for example cloth. The illumination device is for example a LED strip or an individual LED or a lightbulb or a striplight or fluorescent light. In this embodiment, such illumination device is integrated into the roof lining. For example, the illumination device is placed on top of the roof lining, i.e., the roof lining is partly covered by the illumination device. In other examples, the illumination device is embedded into the roof lining, i.e., the illumination device is part of the roof lining. In still other examples, the illumination device is placed behind the roof lining, i.e., the roof lining covers the illumination device; in such examples, the roof lining is at least partly transparent such that the light emitted by the illumination device penetrates the roof lining and thus is visible when looking at the roof lining. In still other examples, the illumination device is integrated in a panel or an encasing, which panel or encasing is at least partly transparent, optionally fully transparent, such that light emitted by the illumination device can penetrate the panel or encasing and thus is visible when looking at the panel or encasing. The panel or encasing then functions as the roof lining. In other words, the illumination device is part of or forms the roof lining of the inside surface of the non-transparent roof of the vehicle.

By integrating the illumination device in the roof lining of the inside surface, the at least one characteristic of the light impinging on the section of the outside surface of the non-transparent roof can be mimicked with reduced processing loads for the control device: there is a 1-1 or near 1-1 correspondence between the at least one characteristic of the light impinging on the section of the outside surface of the non-transparent roof and the at least one characteristic of the light emitted light from the section of the inside surface of the non-transparent roof.

Optionally, in this embodiment, the illumination device is integrated in the section of the inside surface of the non-transparent roof of the vehicle.

By integrating the illumination device in the section of the inside surface, the construction of the interior lighting system is simplified, and processing loads for the control device are minimized: there is a 1-1 or near 1-1 correspondence between the position of the illumination device and the section of the inside surface to emit light from. Therefore, by integrating the illumination device in the section of the inside surface, the light impinging on the section of the outside surface of the non-transparent roof can be mimicked directly by the illumination device.

Optionally, in this embodiment, the non-transparent roof comprises a plurality of roof sections, the roof sections being arranged in a pattern. Each roof section of the non-transparent roof comprises a corresponding section of the outside surface of the non-transparent roof and a corresponding section of the inside surface of the non-transparent roof.

Thus, the inside surface comprises multiple sections, and the precision of mimicking the at least one characteristic of the light impinging on the outside surface of the non-transparent roof, by emitting light from the inside surface, is increased. In other words, by increasing the number of sections of the inside surface, more values representing the light impinging on the non-transparent roof can be mimicked, i.e., one value per section of the inside surface.

Optionally, in this embodiment, the interior lighting system comprises a same number of illumination devices as a number of roof sections, each illumination device being configured to emit light from a respective section of the inside surface of the non-transparent roof.

Thus, an illumination device is integrated in each section of the inside surface of the non-transparent roof of the vehicle. By increasing the inside resolution, the number of illumination devices is increased, and thus, the light impinging on the outside surface of the non-transparent roof is mimicked with increased precision. By integrating the illumination devices in the roof sections, the illumination devices are part of or in some cases form the roof lining of the inside surface of the non-transparent roof.

Optionally, in this embodiment, the sensor device is configured to infer at least one characteristic of light impinging on each section of the outside surface of the non-transparent roof. The control device is configured to control each illumination device such that the at least one characteristic of the light emitted by a respective illumination device mimics the at least one characteristic of light impinging on a respective section of the outside surface of the non-transparent roof.

Thereby, processing loads for the control device are minimized to control the illumination devices to mimic the at least one characteristic of light impinging on the sections of the outside surface of the non-transparent roof by emitting light from the sections of the inside surface of the non-transparent roof, since there is a 1-1 or near 1-1 correspondence between the roof sections, the sections of the outside surface, the sections of the inside surface, and the illumination devices that are configured to emit light from the sections of the inside surface of the non-transparent roof of the vehicle.

Optionally, in this embodiment, the roof sections are arranged in a grid pattern.

The grid pattern for example defines a rectangle. In other words, the grid pattern defines a rectangular area of the non-transparent roof, which rectangular are comprises the plurality of roof sections.

In an embodiment according to the first aspect of the invention, the illumination device comprises a plurality of light sources, wherein for example the light sources are light-emitting diodes. The control device is configured to control the plurality of light sources such that at least one characteristic of light emitted by the illumination device match the at least one characteristic of light impinging on the section of the outside surface of the non-transparent roof inferred by the sensor device.

In some cases, the inside resolution is lower than the outside resolution. In such cases, the amount of sections of the inside surface is lower than the amount of sections of the outside surface. In still other cases, the sensor device is configured to infer at least one characteristic of light impinging on the section of the outside surface with a certain refresh rate, i.e., the sensor device is configured to infer the at least one characteristic multiple times per second.

To accurately mimic the light impinging on the outside surface, the illumination device in this embodiment comprises a plurality of light sources. For example, the illumination device is a LED strip and the light sources are individual light emitting diodes. The individual light sources are individually addressable, i.e., the control device being connected to the illumination device is able to control each light source individually to emit light having particular characteristics. This embodiment minimizes the amount of components required for the interior lighting system, since a single illumination device may be used to emit light from a relatively large area of the inside surface of the non-transparent roof.

In a case where the inside resolution is lower than the outside resolution, the control device is configured to control each light source comprised in the illumination device individually such that at least one characteristic of light emitted from the section of the inside surface of the non-transparent roof mimics the at least one characteristic of light impinging on multiple sections of the outside surface of the non-transparent roof. In other words, the section of the inside surface is virtually divided by the control device into multiple smaller sections that correspond 1-1 or near 1-1 to sections of the outside surface. Thereby, multiple virtual subsets of light sources is created which are associated with and correspond to the multiple smaller sections within the section of the inside surface of the non-transparent roof.

In a case where the sensor device is configured to infer at least one characteristic of light impinging on the section of the outside surface with a certain refresh rate, the sensor device is configured to temporally buffer the inferred at least one characteristic of the light impinging on the section of the outside surface of the non-transparent roof. Thus, such a buffer comprises multiple inferred characteristics of the light impinging on the section of the outside surface over a certain time period. The placement of each individual light source is known, and therefore, based on the velocity and/or speed of the vehicle, it is known at what point in time the buffered characteristics of the light impinging on the section of the outside surface are to be mimicked by the individual light sources. Thereby, with minimal additional processing, the control device is configured to individually address the individual light sources to mimic light impinging on the outside surface accurately over time. Thereby, the inside resolution is increased without increasing the number of sections of the inside surface of the non-transparent roof.

Optionally, in this embodiment, the non-transparent roof comprises a plurality of roof sections, the roof sections being arranged in a pattern. Each roof section of the non-transparent roof comprises a corresponding section of the outside surface of the non-transparent roof and a corresponding section of the inside surface of the non-transparent roof. The interior lighting system comprises a same number of illumination devices as a number of roof sections, each illumination device being configured to emit light from a respective section of the inside surface of the non-transparent roof.

Thus, each illumination device emits light from exactly one section of the inside surface of the non-transparent roof. A section resolution is additionally defined by the illumination device comprising multiple light sources. In other words, by increasing the number of light sources, the section resolution is increased. By increasing the section resolution, light impinging on the outside surface of the non-transparent roof is more accurately mimicked by emitting light from the section of the inside surface, wherein within that section, each light source may emit light with differing characteristics, as the light sources are individually addressable and controllable by the control device.

Optionally, in this embodiment, the sensor device is configured to infer at least one characteristic of light impinging on each section of the outside surface of the non-transparent roof. The control device is configured to control each illumination device such that the at least one characteristic of the light emitted by a respective illumination device mimics the at least one characteristic of light impinging on a respective section of the outside surface of the non-transparent roof.

Thus, the capability of the control device to mimic the light impinging on the outside surface of the non-transparent roof is increased since the section resolution allows for differentiating characteristics to be mimicked within a single section of the inside surface. Such differentiating characteristics allow for a more fine-grained mimicking of the light impinging on the outside surface of the non-transparent roof.

Optionally, in this embodiment, the roof sections are arranged in a grid pattern.

Optionally, in this embodiment, the illumination device is integrated in a roof lining of the inside surface of the non-transparent roof of the vehicle. The illumination device is integrated in the section of the inside surface of the non-transparent roof of the vehicle.

According to the first aspect of the invention, the invention further pertains to a vehicle comprising an interior lighting system. The interior lighting system is a lighting system according to any one of the embodiments of the interior lighting system according to the first aspect of the invention.

The vehicle comprises a non-transparent roof. By integrating the interior lighting system into the vehicle, light impinging on the outside surface of the non-transparent roof is mimicked by emitting light from the inside surface of the non-transparent roof. Thereby, an effect is achieved as though the roof were transparent.

According to the first aspect of the invention, the invention further pertains to a computer-implemented method to control an interior lighting system of a vehicle, the vehicle comprising a non-transparent roof, the non-transparent roof comprising an outside surface which is exposed to an environment surrounding the vehicle and an inside surface which is exposed to an internal volume of the vehicle, wherein the section of the outside surface of the non-transparent roof of the vehicle is associated with the section of the inside surface of the non-transparent roof of the vehicle, the method comprising the steps of:

receiving, from a sensor device, at least one characteristic of light impinging on a section of the outside surface of the non-transparent roof of the vehicle, inferred by the sensor device;

controlling an illumination device of the interior lighting system of the vehicle, the illumination device being configured to emit light from a section of the inside surface of the non-transparent roof of the vehicle into the internal volume of the vehicle, such that at least one characteristic of light emitted from the section of the inside surface mimics the at least one characteristic of light impinging on the section of the outside surface of the non-transparent roof, inferred by the sensor device.

In an embodiment according to the first aspect of the invention, the non-transparent roof comprises a plurality of roof sections, the roof sections being arranged in a pattern. Each roof section of the non-transparent roof comprises a corresponding section of the outside surface of the non-transparent roof and a corresponding section of the inside surface of the non-transparent roof. The interior lighting system comprises a same number of illumination devices as a number of roof sections, each illumination device being configured to emit light from a respective section of the inside surface of the non-transparent roof. The sensor device is configured to infer at least one characteristic of light impinging on each section of the outside surface of the non-transparent roof.

In this embodiment, the method further comprises the step of controlling each illumination device such that the at least one characteristic of the light emitted by a respective illumination device mimics the at least one characteristic of light impinging on a respective section of the outside surface of the non-transparent roof.

In an embodiment according to the first aspect of the invention, in the step of receiving, from a sensor device, at least one characteristic of light impinging on a section of the outside surface of the non-transparent roof of the vehicle, inferred by the sensor device, the at least one characteristic of light impinging on a section of the outside surface of the non-transparent roof of the vehicle are received with an update frequency that is equal to or more than 25 Hz.

In an embodiment according to the first aspect of the invention, the illumination device comprises a plurality of light sources, wherein for example the light sources are light-emitting diodes. In this embodiment, the method further comprises the step of controlling the plurality of light sources such that at least one characteristic of light emitted by the illumination device match the at least one characteristic of light impinging on the section of the outside surface of the non-transparent roof inferred by the sensor device.

According to the first aspect of the invention, the invention further pertains to a computer program comprising instructions, which, when the computer program is executed by a computing device, cause the computing device to carry out the steps of the method according to the first aspect of the invention.

In a second aspect of the invention, the invention intends to combine the advantages of a transparent roof with the benefits of a non-transparent roof. To that end, a vehicle with a non-transparent roof and an internal volume for containing passengers, and a lighting system for lighting at least part of the internal volume is characterized in that the vehicle is equipped with a sensor for detecting the amount of light impinging on the roof, the signal of the sensor equipped to adjust the illumination level of the lighting system.

By having a lighting system with a variable intensity, and sensors sensing the light level outside the vehicle, the internal lighting level can correspond with the external lighting level. This implies that, when driving in the sun, the internal lighting level is high as well, but when, for example, entering a tunnel, the lighting level is lowered. Also, when driving in a road with (overhanging) trees the lighting level is adjusted accordingly.

It is noted that in its simplest form the sensor is, for example, a light sensor placed behind the front wind shield.

In an embodiment according to the second aspect of the invention the roof shows a multitude of photovoltaic cells, the cells serialized and connected to multiple Maximum Power Point Trackers (MPPT's), the MPPTs having a sensor output, the sensor output outputting a signal that is a function of the illumination of the PV cells connected to the MPPT's Recently vehicles with solar cells integrated in their roof are introduced. An example thereof is the Lightyear One, commercially available from Atlas Technologies B.V., Helmond, the Netherlands. As will be clear to the skilled artisan such a roof is not transparent, although a slight transparency could be maintained. Groups of solar cells of such a roof are typically connected in series to form a string. To optimize the power obtained from such a string a Maximum Power Point Tracker (MPPT) is connected to a string to represent a load with an impedance where the string delivers its optimum power. That this is necessary is because this impedance is a function of the illumination of the strings' cells. With little cost the MPPT can be equipped with an output that outputs a signal corresponding with the illumination level of the string, and thus the external light level.

In another embodiment according to the second aspect of the invention the internal lighting system comprises several lighting groups, the groups equipped to output spatially different lighting levels depending on spatially different sensor levels.

In this embodiment the lighting system is divided in several groups, and each group is connected to a corresponding sensor. This enables, for example, to change the intensity level forming a pattern corresponding to the pattern of the illumination illuminating the roof. As an example, a shadow of a tree branch would be mimicked by the internal lighting system on the internal roof of the vehicle.

In yet another embodiment according to the second aspect of the invention the sensor is an output of an MPPT, the lighting system comprising illuminated dials and/or indicators and/or screens, the intensity of the illumination of at least part of the dials and/or indicators and/or screens a function of the sensor value.

Most vehicles have illuminated dials, indicators and screens for vehicle to driver interaction. This includes navigation systems, an indicator for a speedometer, blink indicators, etc. When in sunlight (when the driver is looking into a brightly lit exterior environment) the illumination level of such dials, indicators and screens is preferably much higher than when driving in the dark.

In still another embodiment according to the second aspect of the invention the vehicle is further equipped with a manually adjustable override for overriding the sensor.

A manual override, either increasing the illumination or decreasing the illumination. An example is to increase the illumination when parked in the dark, for example when reading a map.

It is noted that such a manual override can be a manually adjustable level, or a binary override either offering a first level and/or a second level.

In yet another embodiment according to the second aspect of the invention in which the lighting system is equipped to change colour as well as intensity.

Preferably the lighting system is equipped to not only change its intensity level, but also its colour. This enables for example to change the corresponding colour temperature of the lighting, from a high temperature of 10.000K at noon to less than 3000K when the sun is low above the horizon. Also, the greenish colour in a road with overhanging tree branches may be mimicked.

It is noted that a solar cell connected to a MPPT is in most cases not sensitive for the colour of the (external) light, but other sensors may. Also multi-junction solar cells, basically two stacked layers of solar cells, can discriminate on colour if the stacked layers have each their own (sets of) MPPT's.

In yet another embodiment according to the second aspect of the invention the lighting system comprises light conducting fibres transporting light from one or more light sources to parts of the internal roof.

In another embodiment according to the second aspect of the invention the lighting system comprises a programmable controller, the programmable controller having as input the output signal of one or more sensors and as output one or more signals for driving the lighting system.

It is noted that both input and output signals may be multiplexed, or may be addressable values, in which the sensors and the programmable controller are connected by, for example, a CAN bus. Likewise, the programmable controller and the lighting system can be connected via a CAN bus.

According to the second aspect of the invention, the programmable controller is programmed with software, and protection is sought for the software for programming the programmable controller.

BRIEF DESCRIPTION OF THE DRAWINGS

The invention is described below with reference to the figures. These figures serve as examples to illustrate the invention, and will not be construed as limiting the scope of the claims. In the different figures, like features are indicated by the like reference numerals.

In the figures.

DETAILED DESCRIPTION

Figure 1:
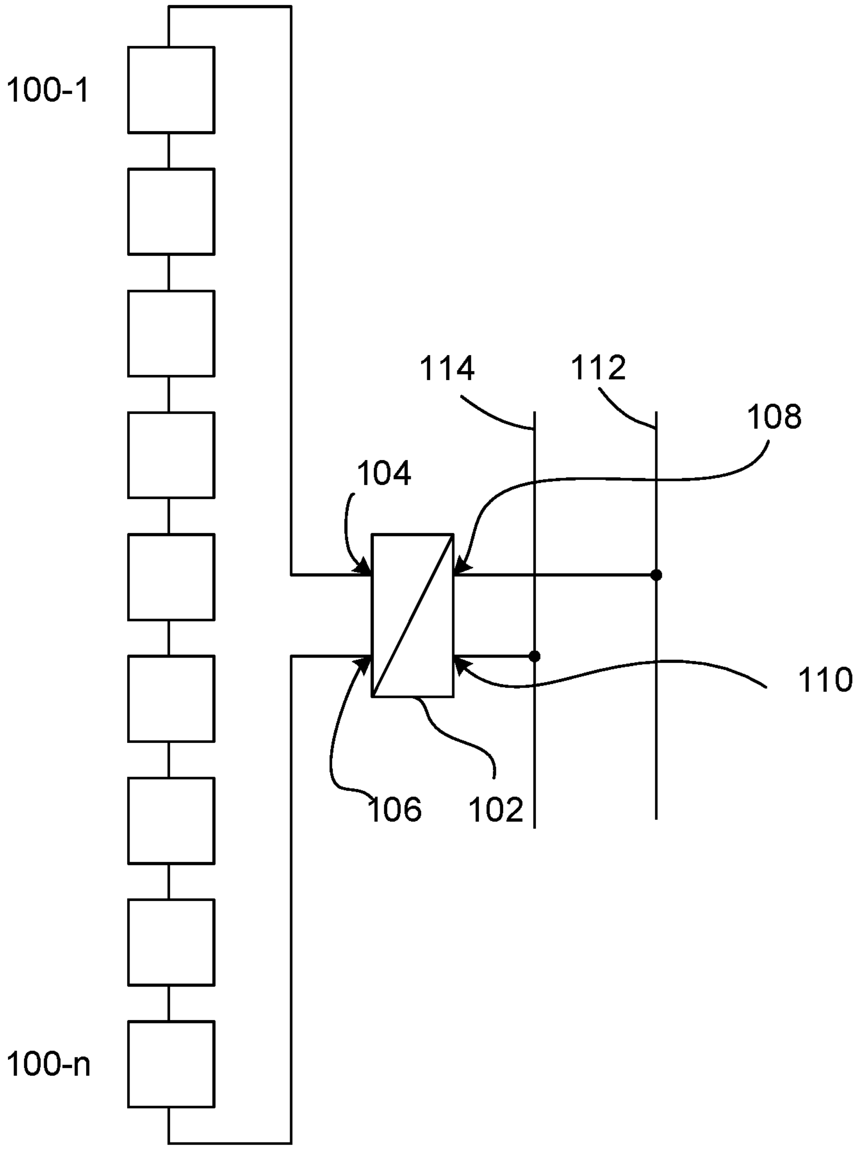
FIG. 1 schematically shows a string of PV cells with a MPPT according to the second aspect of the invention, FIG. 2 schematically shows a lighting system according to the second aspect of the invention.

FIG. 1 schematically shows a string of solar cells, also known as photovoltaic cells or PV cells, with a MPPT, according to the second aspect of the invention.

Each cell 100-1 to **100-*n*** are interconnected to forma a string that has, when illuminated, an open source voltage Uopen ≅0.7V and a short circuit current Ishort that is a function of illumination and surface area. Preferably to maximum total open voltage of the string is a safe voltage, that is: less than 60 V. The mentioned Uopen is a typical values for a monocrystalline silicon solar cell, and other values may occur when using other materials, such as polycrystalline silicon, GaAs, Perovskites, organic solar cells, etc.

Maximum power can be 'harvested' at an impedance (load resistance) that is dependent on the illumination. A Maximum Power Point Tracker 102, or MPPT, is known to the skilled artisan as such, and described in, for example, European patent application EP2933699A1, "CONTROL DEVICE FOR IN-VEHICLE SOLAR CELL", to Toyota. The MPPT has two inputs 104 and 106 connected to the string and outputs it at output 108 to a power bus 112.

As a MPPT must change its load impedance according to the illumination of the solar cell, a small addition to the electronics enables the MPPT to act as a sensor output 110 for the amount of light falling onto the string of solar cells.

It is noted that in many cases the MPPT will have such a signal already build-in for, for example, diagnostic purposes. The signal may be available as an analog signal or available on a digital bus 112, such as a CAN bus, in which each MPPT has its unique address. Another type of (multiplexed) bus is possible as well.

Figure 2:
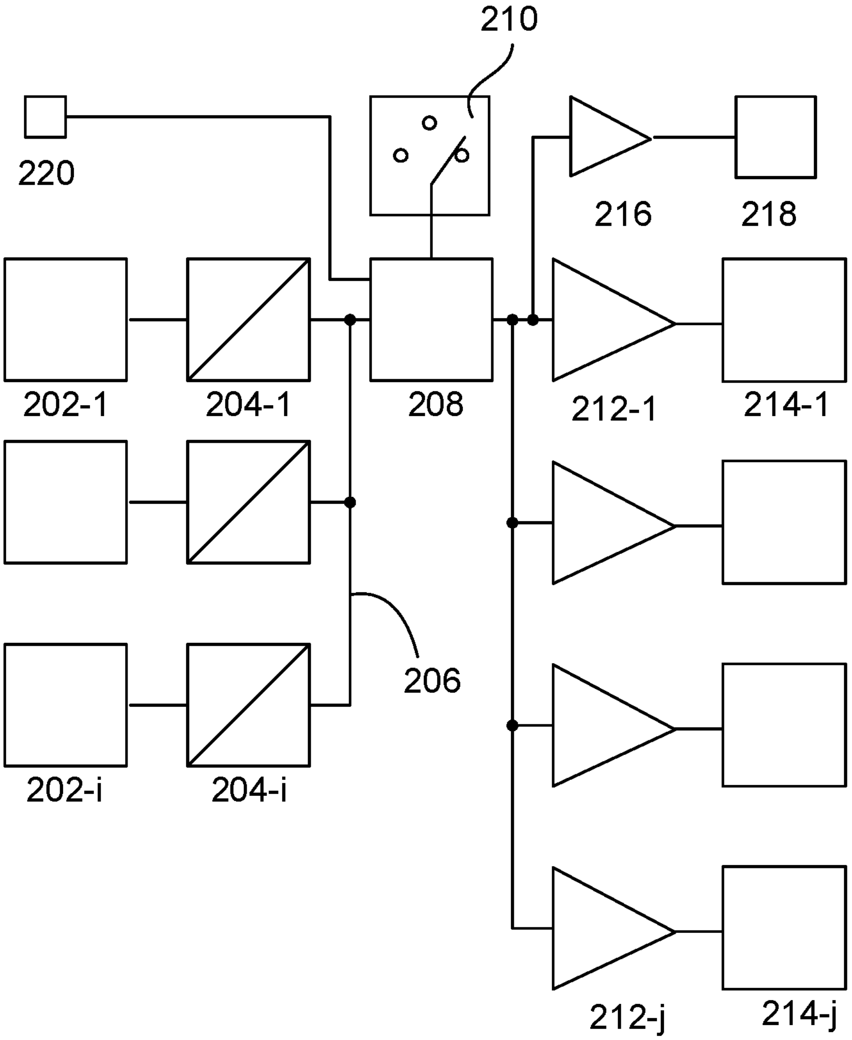

FIG. 2 schematically shows a lighting system according to the second aspect of the invention.

FIG. 2 schematically shows several strings 202 of PV cells, each connected to a MPPT 204, the MPPT's via a bus, such as a CAN bus 206, connected to a programmable controller 208 (also known as microprocessor). The CAN bus is a bus known to the skilled person as a communication bus widely used in the automotive industry. A manual override switch 210 is connected to the controller 208, the switch giving an override signal to the controller. The manual override signal preferably has three states: ON, AUTO and OFF, corresponding to the states "Lighting on", "Lighting controlled by the sensor" and "Lighting Off". However, other combinations are possible, and the level of intensity for the ON level can be a (predetermined) level differing from the maximum lighting achievable in the "AUTO" state.

The controller outputs one or more signals to one or more drivers 212-1 . . . **212-*j*, the one or more drivers connected to corresponding light sources 214-1 . . . 214*j*, such as LED's. It is noted that several light sources can be connected in series and/or in parallel to one driver. The light sources then illuminate the interior of the vehicle. Likewise, the programmable controller is connected to the driver(s) 216 of the intensity control of dials and/or indicators and/or screens 218**. The skilled artisan can think of many more variants As the controller is a programmable controller, different behaviour can be programmed into the controller by loading appropriate software into the controller.

It is noted that the controller, drivers and lighting sources can made to change its hue, either by manual override or by a sensor value. This need not be the same sensor as the one controlling the intensity (for example the output of an MPPT) but, as an example, may well be a forward-looking colour discriminating sensor 220 mounted near the wind shield. The sensor can have a separate input on the controller, or it may be connected to the CAN bus 206.

It is noted that also the drivers may be connected to CAN bus 206, or to a separate CAN bus.

The drivers in turn deliver the power (voltage, current) for the light emitting parts, such a LED's. The light is distributed over the (inside) of the roof either by having the light sources (LED's) distributed over the roof, or by, for example, transporting the light from the LEDs to different ports of the roof by glass fibres or such like. In the latter case the whole roof, being of a woven fibre transporting light, may light-up uniformly.

Software update of the programmable controller can be done via an update bus, or via Over-the-Air (OTA) transmission, both methods known to the skilled person.

Figure 3:
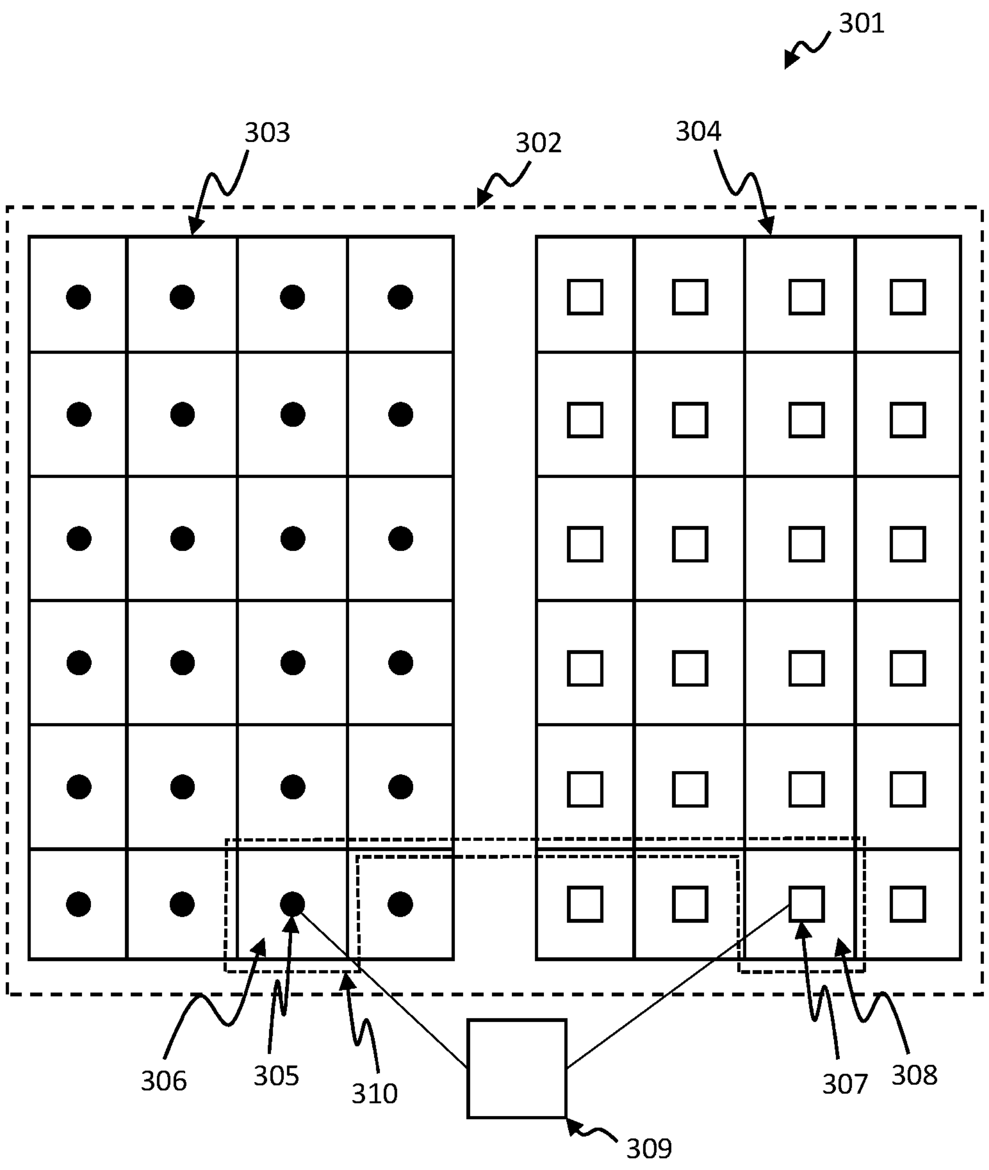
FIG. 3 schematically shows a lighting system according to an embodiment of the first aspect of the invention.

FIG. 3 schematically shows a lighting system 301 for a vehicle according to an embodiment of the first aspect of the invention.

The vehicle comprises a non-transparent roof 302. The non-transparent roof 302 comprises an outside surface 303 which is exposed to an environment surrounding the vehicle and an inside surface 304 which is exposed to an internal volume of the vehicle.

The interior lighting system comprises a sensor device 305 configured to infer at least one characteristic of light impinging on a section 306 of the outside surface 303 of the non-transparent roof 302 of the vehicle.

The interior lighting system further comprises an illumination device 307 configured to emit light from a section 308 of the inside surface 304 of the non-transparent roof 302 of the vehicle into the internal volume of the vehicle;

The interior lighting system further comprises a control device 309 connected to the sensor device 305 and the illumination device 307, the control device 309 being configured to control the illumination device 307 such that at least one characteristic of light emitted from the section 308 of the inside surface 304 of the non-transparent roof 302 mimics the at least one characteristic of light impinging on the section 306 of the outside surface 303 of the non-transparent roof 302 inferred by the sensor device 305.

The section 306 of the outside surface 303 of the non-transparent roof 302 of the vehicle is associated with the section 308 of the inside surface 304 of the non-transparent roof 302 of the vehicle.

The non-transparent roof 302 comprises a plurality of roof sections 310, the roof sections 310 being arranged in a pattern. In the figure, one such roof section 310 is depicted. Each roof section 310 of the non-transparent roof 302 comprises a corresponding section 306 of the outside surface 303 of the non-transparent roof 302 and a corresponding section 308 of the inside surface 304 of the non-transparent roof 302. In total, the non-transparent roof 302 depicted in FIG. 3 comprises 24 roof sections, although only one is explicitly shown. In total, the outside surface 303 of the non-transparent roof 302 depicted in FIG. 3 comprises 24 sections 306. In total, the inside surface 304 of the non-transparent roof 302 depicted in FIG. 3 comprises 24 sections 308. Thus, each roof section 310 comprises one section 306 of the outside surface 303 and one section 308 of the inside surface 304.

The sensor device 305 is configured to infer at least one characteristic of light impinging on each section 306 of the outside surface 303 of the non-transparent roof 302.

The control device 309 is configured to control each illumination device 307 such that the at least one characteristic of the light emitted by a respective illumination device 307 mimics the at least one characteristic of light impinging on a respective section 306 of the outside surface 303 of the non-transparent roof 302. In total, the interior lighting system 301 shown in FIG. 3 comprises 24 illumination devices 307.

The interior lighting system 301 comprises a same number of sensor devices 305 as the number of roof sections, each sensor device 305 being configured to infer at least one characteristic of light impinging on a respective section 306 of the outside surface 303 of the non-transparent roof 302.

The roof sections 310 are arranged in a grid pattern. The roof sections 310 are arranged in a grid pattern of 4×6.

In the perspective of FIG. 3, the outside surface 303 and the inside surface 304 are viewed from the perspective, i.e., either from outside of the vehicle, or from inside of the vehicle. Thus, to correctly view the figure, it must be imagined that the outside surface 303 is placed on top of the inside surface 304. Thereby, section 306 of the outside surface 303 is associated with section 308 of the inside surface 304.

Figure 4:
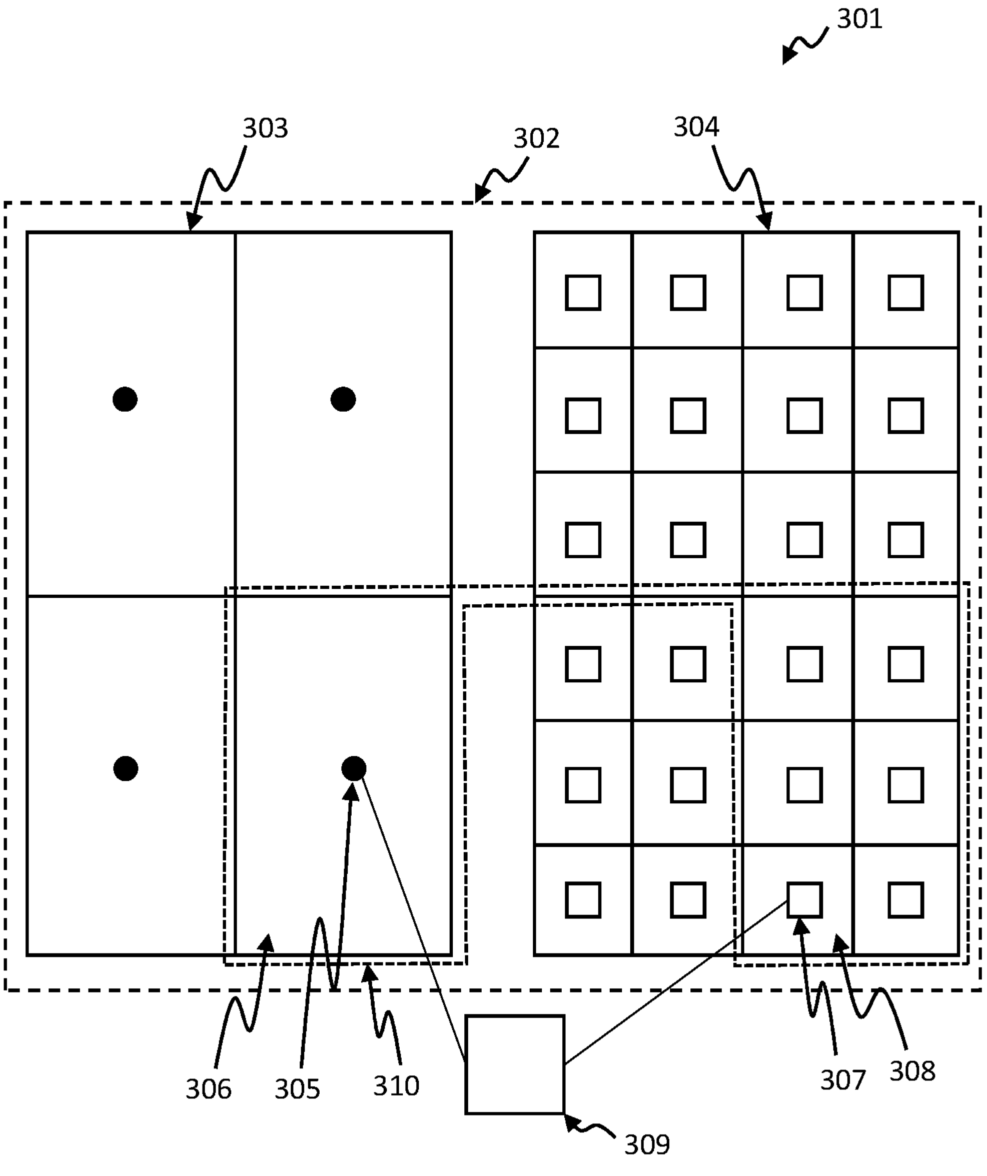
FIG. 4 schematically shows a lighting system according to an embodiment of the first aspect of the invention.

FIG. 4 schematically shows a lighting system 301 according to an embodiment of the first aspect of the invention.

The embodiment shown in FIG. 4 is identical to the embodiment shown in FIG. 3 except for the following modifications.

The non-transparent roof 302 comprises a plurality of roof sections 310, the roof sections 310 being arranged in a pattern. In the figure, one such roof section 310 is depicted. Each roof section 310 of the non-transparent roof 302 comprises a corresponding section 306 of the outside surface 303 of the non-transparent roof 302 and a plurality of corresponding sections 308 of the inside surface 304 of the non-transparent roof 302. In total, the non-transparent roof 302 depicted in FIG. 4 comprises 4 roof sections, although only one is explicitly shown. In total, the outside surface 303 of the non-transparent roof 302 depicted in FIG. 4 comprises 4 sections 306. In total, the inside surface 304 of the non-transparent roof 302 depicted in FIG. 4 comprises 24 sections 308. Thus, each roof section 310 comprises one section 306 of the outside surface 303 and six sections 308 of the inside surface 304.

Therefore, the inside resolution is larger than the outside resolution. The sensor device 305 is configured to temporally buffer the inferred at least one characteristic of the light impinging on the section 306 of the outside surface 303 of the non-transparent roof 302. Thus, such a buffer comprises multiple inferred characteristics of the light impinging on the section 306 of the outside surface 303 over a certain time period. The control device 305 is further configured to control the illumination device 307 such that at least one characteristic of light emitted from the section 308 of the inside surface 304 of the non-transparent roof 302 mimics the at least one characteristic of light impinging on the section 306 of the outside surface 303 of the non-transparent roof 302 inferred by the sensor device 305. Such controlling is performed by using the buffered inferred characteristics of the light impinging on the section 306 of the outside surface 303 over the certain time period.

Figure 5:
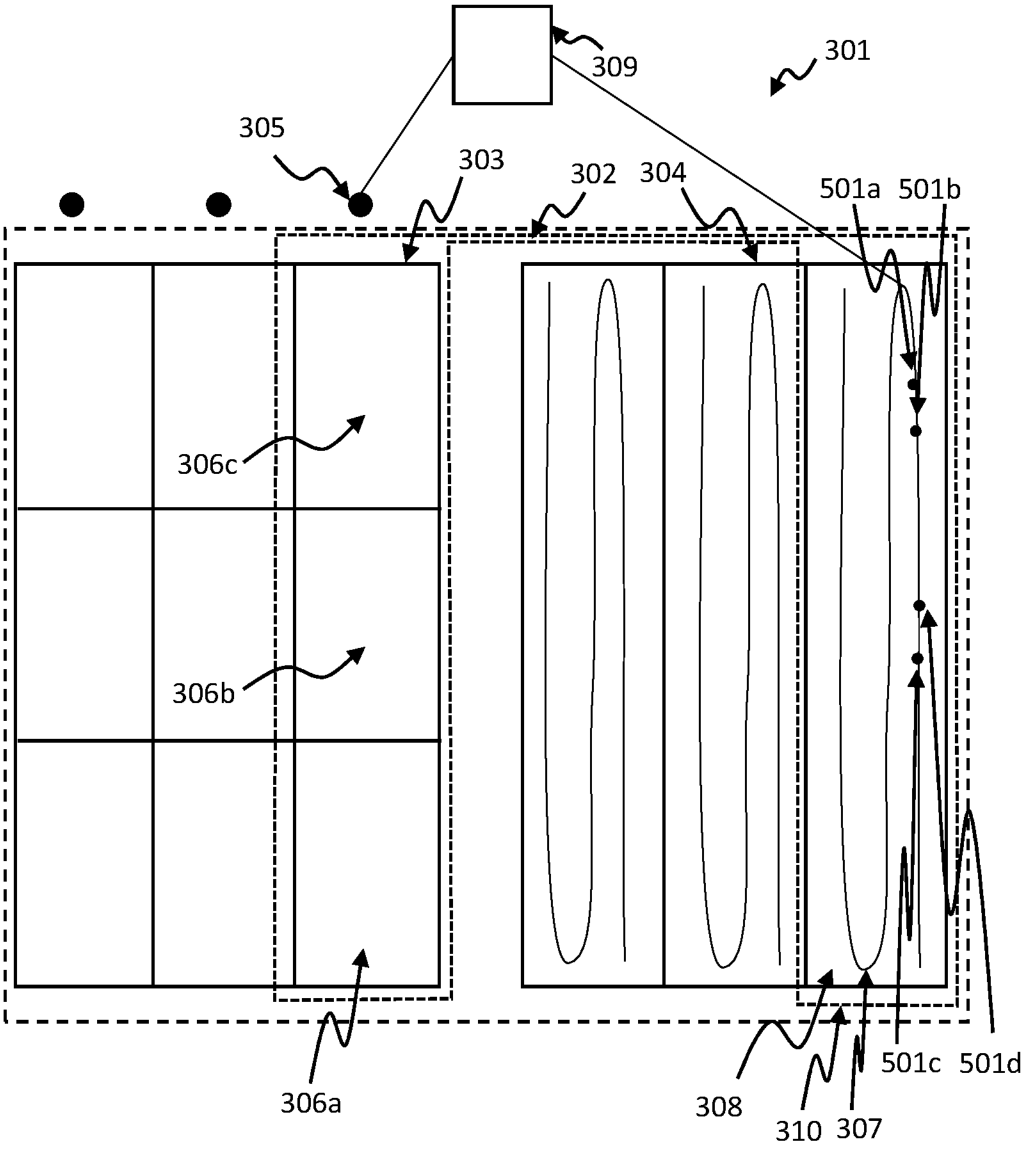
FIG. 5 schematically shows a lighting system according to an embodiment of the first aspect of the invention.

FIG. 5 schematically shows a lighting system 301 according to an embodiment of the first aspect of the invention.

The embodiment shown in FIG. 5 is identical to the embodiment shown in FIG. 4 except for the following modifications.

The non-transparent roof 302 comprises a plurality of roof sections 310, the roof sections 310 being arranged in a pattern. In the figure, one such roof section 310 is depicted. Each roof section 310 of the non-transparent roof 302 comprises a corresponding section 306 of the outside surface 303 of the non-transparent roof 302 and a corresponding sections 308 of the inside surface 304 of the non-transparent roof 302. In total, the non-transparent roof 302 depicted in FIG. 5 comprises 3 roof sections, although only one is explicitly shown. In total, the outside surface 303 of the non-transparent roof 302 depicted in FIG. 5 comprises 9 sections 306, of which three sections 306*a*, 306*b*, 306*c* are shown. In total, the inside surface 304 of the non-transparent roof 302 depicted in FIG. 5 comprises 3 sections 308. Thus, each roof section 310 comprises three sections 306 of the outside surface 303 and one section 308 of the inside surface 304.

The sensor device 305 is arranged outside of the non-transparent roof 302. The sensor device 305 is configured to infer at least one characteristic of light impinging on sections 306*a*, 306*b*, and 306*c* of the outside surface 303 of the non-transparent roof 302 of the vehicle. Therefore, the sensor device 305 is configured to temporally buffer inferred at least one characteristic of the light impinging on the sections 306*a*, 306*b*, and 306*c* of the outside surface 303 of the non-transparent roof 302. Thus, such a buffer comprises multiple inferred characteristics of the light impinging on the section 306*a*, 306*b*, and 306*c* of the outside surface 303 over a certain time period. The control device 305 is further configured to control the illumination device 307 such that at least one characteristic of light emitted from the section 308 of the inside surface 304 of the non-transparent roof 302 mimics the at least one characteristic of light impinging on the section 306*a*, 306*b*, and 306*c* of the outside surface 303 of the non-transparent roof 302 inferred by the sensor device 305. Such controlling is performed by using the buffered inferred characteristics of the light impinging on the section 306*a*, 306*b*, 306*c* of the outside surface 303 over the certain time period.

The illumination device 307 comprises a plurality of light sources 501, of which four light sources 501*a*, 501*b*, 501*c*, 501*d* are shown, wherein the illumination device is a LED strip and the light sources are light-emitting diodes. The illumination device is arranged in an “S”-pattern within the section 308 of the inside surface 304. The control device 309 is configured to control the plurality of light sources 501 such that at least one characteristic of light emitted by the illumination device 307 match the at least one characteristic of light impinging on the section 306 of the outside surface of the non-transparent roof inferred by the sensor device 305.

In particular, in this embodiment, the temporally buffered at least one characteristic are used by the control device 309 to individually control the light sources 501*a*, 501*b*, 501*c*, 501*d* such that at least one characteristic of light emitted by the illumination device 307 match the at least one characteristic of light impinging on the sections 306*a*, 306*b*, and 306*c* of the outside surface of the non-transparent roof inferred by the sensor device 305. In particular, the at least one characteristic of light impinging on section 306*c* of the outside surface 303 is used by the control device 309 at a particular time instant to control the light emitted by light source 501*a* and 501*b*, since these light sources 501*a* and 501*b* are located within the corresponding section 308 of the inside surface 304. Additionally, these light sources 501*a* and 501*b* are located within a virtual section (not shown) corresponding to the section 306*c* of the outside surface 303. Those same at least one characteristic of light impinging on section 306*c* of the outside surface 303 is used by the control device 309 at a point in time later than that particular time instant to control the light emitted by light source 501*c* and 501*d*, since these light sources 501*a* and 501*b* are located within the corresponding section 308 of the inside surface 304. Additionally, these light sources 501*c* and 501*d* are located within a virtual section (not shown) corresponding to the section 306*b* of the outside surface 303. This is assuming that the vehicle is travelling forwards with a velocity larger than 0, and that the section 306*c* of the outside surface 303 is closer to the front of the vehicle than section 306*a* of the outside surface 303.

The sensor device 305 is configured to infer the at least one characteristic of the light impinging on the section 306 of the outside surface 303 of the non-transparent roof 302 of the vehicle with an update frequency that is equal to or more than 25 Hz, such that a real-time effect of the mimicking the at least one characteristic of light impinging on the outside surface 303 is achieved.

Figure 6:
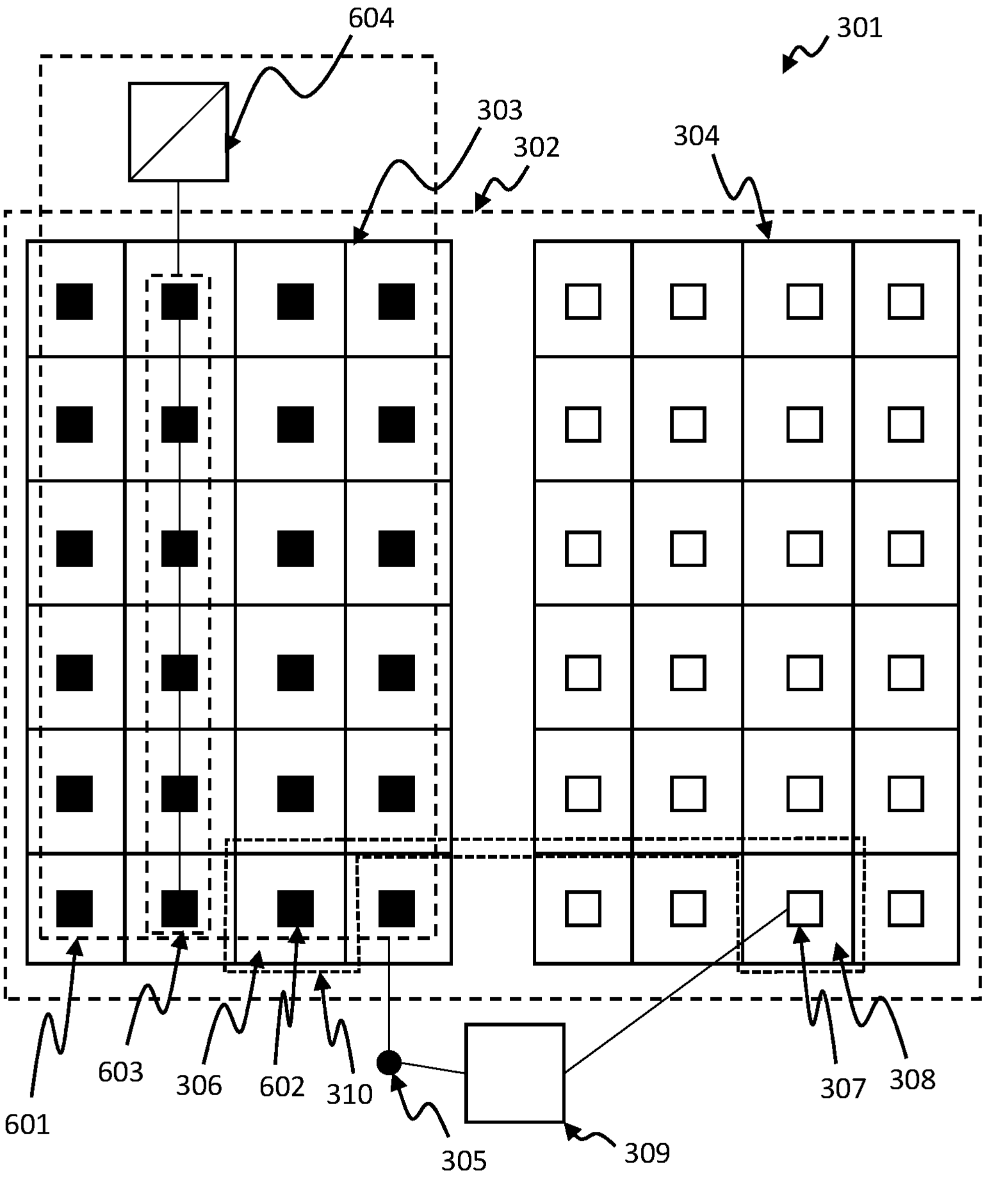
FIG. 6 schematically shows a lighting system according to an embodiment of the first aspect of the invention.

FIG. 6 schematically shows a lighting system 301 according to an embodiment of the first aspect of the invention.

The embodiment shown in FIG. 6 is identical to the embodiment shown in FIG. 1 except for the following modifications.

The sensor device 305 is connected to a photovoltaic system 601 comprising a solar cell 602, the solar cell 602 of the photovoltaic system 601 being arranged within the section 306 of the outside surface 303 of the non-transparent roof 302. Thus, the parameter indicative of the photovoltaic system's output is directly usable to infer the at least one characteristic of the light impinging on the section 306 of the outside surface 303. The sensor device 305 is configured to infer the at least one characteristic of the light impinging on the section 306 of the outside surface 303 of the non-transparent roof 302 based on a determination of a parameter indicative of the photovoltaic system's 601 output. The determination of the parameter indicative of the photovoltaic system's 601 output includes a measurement of an electrical power and/or an electrical current and/or an electrical voltage generated by the solar cell 602.

The photovoltaic system 601 comprises a plurality of solar cells 602 forming a string 603 of solar cells. The photovoltaic system 601 further comprises a maximum power point tracker 604 connected to the string 603 of solar cells, wherein the maximum power point tracker 604 is configured to convert power between the photovoltaic system 601 and a load (not shown). The determination of the parameter indicative of the photovoltaic system's 601 output includes a measurement of an electrical power and/or an electrical current and/or an electrical voltage generated by the string 603 of solar cells, which measurement is provided by the maximum power point tracker 604.

Therefore, the inputs of the maximum power point tracker 604 are reused by the sensor device 305 to determine the parameter indicative of the photovoltaic system's 601 output.

Figure 7:
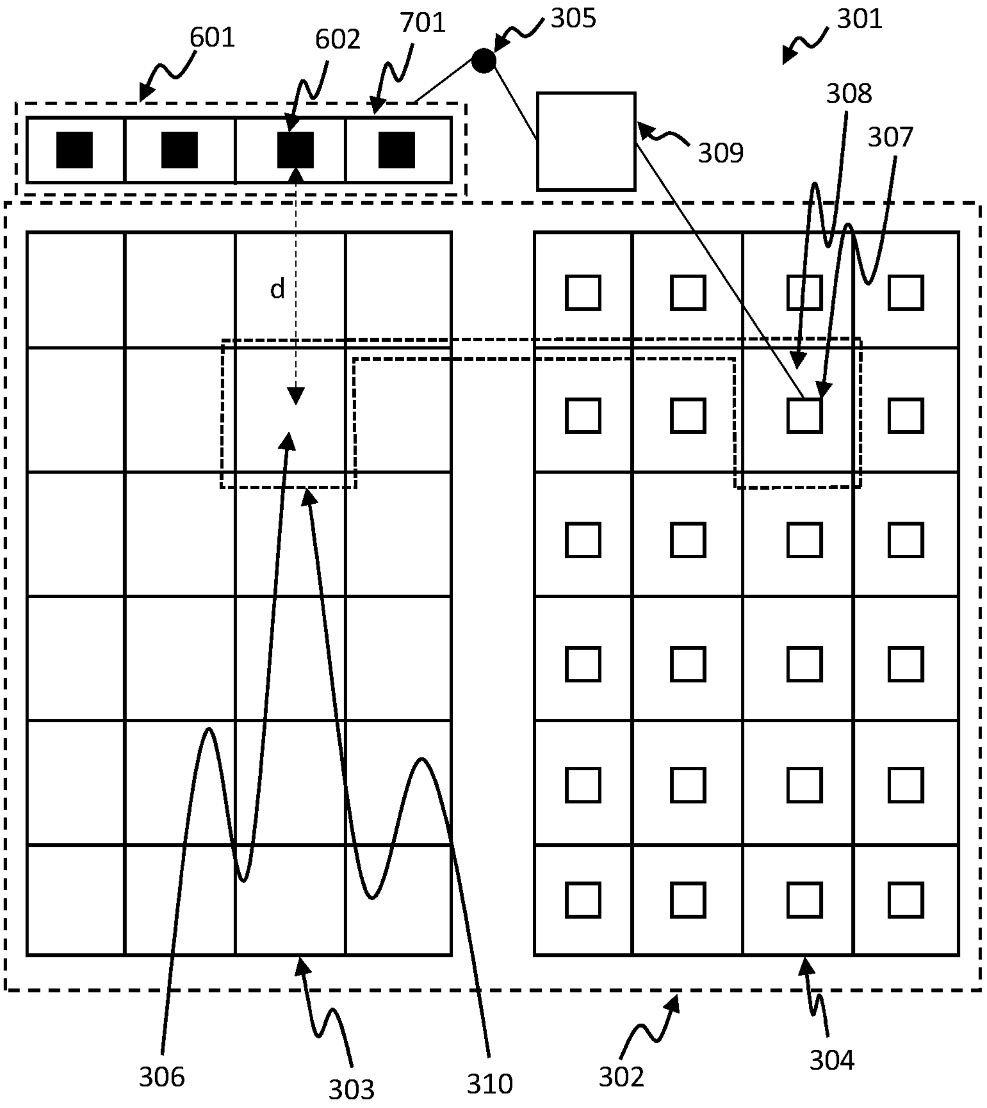
FIG. 7 schematically shows a lighting system according to an embodiment of the first aspect of the invention.

FIG. 7 schematically shows a lighting system 301 according to an embodiment of the first aspect of the invention.

The embodiment shown in FIG. 7 is identical to the embodiment shown in FIG. 6 except for the following modifications.

The solar cell 602 of the photovoltaic system 601 is arranged outside of the section 306 of the outside surface 303 of the non-transparent roof 302. The solar cell is arranged on an upwardly facing outside surface 701 of the vehicle, for example a hood/bonnet of the vehicle. The determination of the parameter indicative of the photovoltaic system's 601 output includes a measurement of an electrical power and/or an electrical current and/or an electrical voltage generated by the solar cell 602.

The sensor device 305 is configured to infer the at least one characteristic of the light impinging on the section 306 of the outside surface 303 of the non-transparent roof 302 additionally based on a distance d of the solar cell 602 to the section 306 of the outside surface 303 of the non-transparent roof 302, and a velocity of the vehicle.

Based on the distance d of the solar cell to the section 306 of the outside surface of the non-transparent roof, and the speed and/or velocity of the vehicle, the sensor device is configured to infer the at least one characteristic of the light impinging on the section 306 of the outside surface 303. For example, the sensor device 305 may calculate that, based on the velocity of the vehicle, a determined parameter indicative of the photovoltaic system's 601 output, for example the output of the solar cell 602, represents the light impinging on the section 306 of the outside surface 303 at a point in time in the future, for example 0.1 s or 0.5 s or 1 s in the future. Therefore, the sensor device 305 may buffer the photovoltaic system's 601 output over time and use said buffered output to infer the at least one characteristic of the light impinging on the section 306 of the outside surface 303.

The invention according to the present disclosure is also described in the following clauses.

1. A vehicle with a non-transparent roof and an internal volume for containing passengers, and a lighting system for lighting at least part of the internal volume, characterized in that the vehicle is equipped with a sensor for detecting the amount of light impinging on the roof, the signal of the sensor equipped to adjust the illumination of the lighting system.

2. A vehicle according to clause 1, the roof showing a multitude of photovoltaic cells (100-1 . . . 100-*n*), the cells serialized to form a string (202) and connected to multiple MPPT's (102, 204), the MPPT's having a sensor output (110), the sensor output outputting a signal that is a function of the illumination of the PV cells connected to the MPPT's.

3. A vehicle according to clause 1 or clause 2, comprising several lighting groups, the groups equipped to output spatially different lighting levels depending on spatially different sensor levels.

4. A vehicle according to any of the preceding clauses, the sensor an output (110) of an MPPT, the lighting system comprising illuminated dials and/or indicators and/or screens, the intensity of the illumination of at least part of the dials and/or indicators and/or screens a function of the sensor value.

5. A vehicle according to any of the preceding clauses, the vehicle further equipped with a manually adjustable override (210) for overriding the sensor.

6. A vehicle according to any of the preceding clauses in which the lighting system is equipped to change colour as well as intensity.

7. A vehicle according to any of the preceding clauses in which the lighting system comprises a software programmable controller (208), the software programmable controller having as input the output signal of one or more sensors and as output one or more signals for driving the lighting system.

8. Software code for programming the programmable controller of clause 7.

9. A lighting system for a vehicle according to any of the preceding clauses, the lighting system comprising light conducting fibres transporting light from a light source to a part of the internal roof.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person. Furthermore, the various terms used in the description should not be interpreted as restrictive but rather as a comprehensive explanation of the invention. The word "a" used herein means one or more than one, unless specified otherwise. The phrase "a plurality of" means two or more than two. The words "comprising" and "having" do not exclude the presence of more elements. Reference figures in the claims should not be interpreted as restrictive of the invention. Particular embodiments need not achieve all objects described. The mere fact that certain technical measures are specified in different dependent claims still allows the possibility that a combination of these technical measures may advantageously be applied.

The invention claimed is:

1. An interior lighting system for a vehicle, the vehicle comprising a non-transparent roof, the non-transparent roof comprising an outside surface which is exposed to an environment surrounding the vehicle and an inside surface which is exposed to an internal volume of the vehicle, the interior lighting system comprising:

a sensor device configured to directly measure at least one characteristic of light impinging on a section of the outside surface of the non-transparent roof of the vehicle;

an illumination device configured to emit light from a section of the inside surface of the non-transparent roof of the vehicle into the internal volume of the vehicle;

a control device connected to the sensor device and the illumination device, the control device being configured to control the illumination device such that at least one characteristic of light emitted from the section of the inside surface of the non-transparent roof mimics the at least one characteristic of light impinging on the section of the outside surface of the non-transparent roof directly measured by the sensor device;

wherein the section of the outside surface of the non-transparent roof of the vehicle is associated with the section of the inside surface of the non-transparent roof of the vehicle.

2. The interior lighting system according to claim 1, wherein:

the non-transparent roof comprises a plurality of roof sections, the roof sections being arranged in a pattern;

each roof section of the non-transparent roof comprises a corresponding section of the outside surface of the non-transparent roof and a corresponding section of the inside surface of the non-transparent roof.

3. The interior lighting system according to claim 2, wherein:

the interior lighting system comprises a same number of illumination devices as a number of roof sections, each illumination device being configured to emit light from a respective section of the inside surface of the non-transparent roof.

4. The interior lighting system according to claim 3, wherein:

the sensor device is configured to directly measure at least one characteristic of light impinging on each section of the outside surface of the non-transparent roof;

the control device is configured to control each illumination device such that the at least one characteristic of the light emitted by a respective illumination device mimics the at least one characteristic of light impinging on a respective section of the outside surface of the non-transparent roof.

5. The interior lighting system according to claim 4, wherein:

the interior lighting system comprises a same number of sensor devices as the number of roof sections, each sensor device being configured to directly measure at least one characteristic of light impinging on a respective section of the outside surface of the non-transparent roof.

6. The interior lighting system according to claim 2, wherein the roof sections are arranged in a grid pattern.

7. The interior lighting system according to claim 1, wherein:

the sensor device is configured to directly measure the at least one characteristic of the light impinging on the section of the outside surface of the non-transparent roof of the vehicle with an update frequency that is equal to or more than 25 Hz.

8. The interior lighting system according to claim 1, wherein:

the sensor device is connected to a photovoltaic system comprising a solar cell, the solar cell being arranged on an upwardly facing outside surface of the vehicle;

the sensor device is configured to directly measure the at least one characteristic of the light impinging on the section of the outside surface of the non-transparent roof based on a determination of a parameter indicative of the photovoltaic system's output.

9. The interior lighting system according to claim 8, wherein:

the solar cell of the photovoltaic system is arranged within the section of the outside surface of the non-transparent roof;

the determination of the parameter indicative of the photovoltaic system's output includes a measurement of an electrical power and/or an electrical current and/or an electrical voltage generated by the solar cell.

10. The interior lighting system according to claim 8, wherein:

the solar cell of the photovoltaic system is arranged outside of the section of the outside surface of the non-transparent roof;

the determination of the parameter indicative of the photovoltaic system's output includes a measurement of an electrical power and/or an electrical current and/or an electrical voltage generated by the solar cell;

the sensor device is configured to directly measure the at least one characteristic of the light impinging on the section of the outside surface of the non-transparent roof additionally based on a distance of the solar cell to the section of the outside surface of the non-transparent roof, and a velocity of the vehicle.

11. The interior lighting system according to claim 8 wherein:

the photovoltaic system comprises a plurality of solar cells forming a string of solar cells;

the photovoltaic system further comprises a maximum power point tracker connected to the string of solar cells, wherein the maximum power point tracker is configured to convert power between the photovoltaic system and a load;

the determination of the parameter indicative of the photovoltaic system's output includes a measurement of an electrical power and/or an electrical current and/or an electrical voltage generated by the string of solar cells, which measurement is provided by the maximum power point tracker.

12. The interior lighting system according to claim 1, wherein the illumination device is integrated in a roof lining of the inside surface of the non-transparent roof of the vehicle.

13. The interior lighting system according to claim 12, wherein the illumination device is integrated in the section of the inside surface of the non-transparent roof of the vehicle.

14. The interior lighting system according to claim 1, wherein:

the illumination device comprises a plurality of light sources, wherein for example the light sources are light-emitting diodes;

the control device is configured to control the plurality of light sources such that at least one characteristic of light emitted by the illumination device match the at least one characteristic of light impinging on the section of the outside surface of the non-transparent roof directly measured by the sensor device.

15. A vehicle comprising an interior lighting system according to claim 1.

16. A computer-implemented method to control an interior lighting system of a vehicle, the vehicle comprising a non-transparent roof, the non-transparent roof comprising an outside surface which is exposed to an environment surrounding the vehicle and an inside surface which is exposed to an internal volume of the vehicle, wherein the section of the outside surface of the non-transparent roof of the vehicle corresponds to the section of the inside surface of the non-transparent roof of the vehicle, the method comprising the steps of:

receiving, from a sensor device, at least one characteristic of light impinging on a section of the outside surface of the non-transparent roof of the vehicle, directly measured by the sensor device;

controlling an illumination device of the interior lighting system of the vehicle, the illumination device being configured to emit light from a section of the inside surface of the non-transparent roof of the vehicle into the internal volume of the vehicle, such that at least one characteristic of light emitted from the section of the inside surface mimics the at least one characteristic of light impinging on the section of the outside surface of the non-transparent roof, directly measured by the sensor device.

* * * * *